(12) United States Patent
Lin et al.

(10) Patent No.: US 9,483,130 B2
(45) Date of Patent: Nov. 1, 2016

(54) TOUCH DEVICE (71) Applicant: InnoLux Corporation, Miao-Li County (TW)

(72) Inventors: Kuan-Li Lin, Miao-Li County (TW);
Ching-I Lo, Miao-Li County (TW);
Shiuan-Yi Hsiung, Miao-Li County (TW); Jen-Hsiang Wang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 50 days.

(21) Appl. No.: 14/458,627

(22) Filed: Aug. 13, 2014

(65) Prior Publication Data
US 2015/0054762 A1 Feb. 26, 2015

(30) Foreign Application Priority Data

Aug. 22, 2013 (TW) .............. 102215729 U (51) Int. Cl.
G06F 3/041 (2006.01)
G06F 3/0354 (2013.01)
G06F 1/16 (2006.01)

(52) U.S. Cl.
CPC ......... *G06F 3/03547* (2013.01); *G06F 1/1601* (2013.01); *G06F 1/1643* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0248547 A1* | 11/2005 | Kent | ................ | G06F 3/0436 345/177 |
| 2011/0183118 A1* | 7/2011 | Lamberson | ............... | C03C 8/02 428/157 |
| 2011/0242749 A1* | 10/2011 | Huang | .................. | G06F 1/1616 361/679.08 |
| 2014/0307181 A1* | 10/2014 | Tang | ...................... | G06F 3/044 349/12 |

* cited by examiner

*Primary Examiner* — Van Chow
(74) *Attorney, Agent, or Firm* — Muncy, Geissler, Olds & Lowe, P.C.

(57) ABSTRACT

A touch device comprises a touch module and a front frame element. The touch module includes a surface having a touch display zone. The front frame element is disposed at an outer edge of the touch module and includes a covering portion located on the surface of the touch module. The thickness of an outer edge of the covering portion adjacent to the touch display zone is between 0.1 mm and 1.6 mm, and the minimum distance from the outer edge of the covering portion to the touch display zone is between 2 mm and 8 mm.

14 Claims, 4 Drawing Sheets

TOUCH DEVICE

CROSS REFERENCE TO RELATED APPLICATIONS

This Non-provisional application claims priority under 35 U.S.C. §119(a) on Patent Application No(s). 102215729 filed in Taiwan, Republic of China on Aug. 22, 2013, the entire contents of which are hereby incorporated by reference.

BACKGROUND OF THE INVENTION

1. Field of Invention

The invention relates to a touch device.

2. Related Art

With the progress of technologies, various novel information apparatuses are invented, such as cell phones, tablet computers, ultrabooks and GPS navigation apparatuses. Generally, a keyboard and mouse are commonly used to manipulate the information apparatus for inputting information. Besides, the touch control technology currently also becomes a popular manipulative method for the information apparatus and brings an intuitive operation. Accordingly, a touch device using the touch control technology can provide a friendly and intuitive interface for the input operation, and therefore users of all ages can manipulate the touch device by fingers or a stylus.

Generally, the touch device can be divided into two types, one is in-cell touch device where a sensing electrode layer is disposed within the display panel (e.g. LCD panel), and the other one is on-cell touch device where an additional touch panel including a sensing electrode layer is disposed on the display panel.

SUMMARY OF THE INVENTION

An objective of the invention is to provide a touch device with a novel structure so as to bring better touch accuracy and touch sensitivity for the operation.

To achieve the above objective, a touch device according to the invention comprises a touch module and a front frame element. The touch module includes a surface having a touch display zone. The front frame element is disposed at an outer edge of the touch module and includes a covering portion located on the surface of the touch module. The thickness of an outer edge of the covering portion adjacent to the touch display zone is between 0.1 mm and 1.6 mm, and the minimum distance from the outer edge of the covering portion to the touch display zone is between 2 mm and 8 mm.

To achieve the above objective, a touch device according to the invention comprises a touch module and a front frame element. The touch module includes a surface having a touch display zone. The front frame element is disposed at an outer edge of the touch module and includes a covering portion located on the surface of the touch module. The thickness of an outer edge of the covering portion adjacent to the touch display zone is between 0.1 mm and 1 mm, and the minimum distance from the outer edge of the covering portion to the touch display zone is between 2 mm and 8 mm. The covering portion has an inclined surface. The minimum distance, in parallel with the surface of the touch module, from a starting point of the inclined surface to the outer edge of the covering portion is between 2 mm and 15 mm, and an included angle formed between an extensive surface of the inclined surface and the surface of the touch module is between 1° and 20°.

To achieve the above objective, a touch device according to the invention comprises a touch module and a front frame element. The touch module includes a surface having a touch display zone. The front frame element is disposed at an outer edge of the touch module and includes a covering portion located on the surface of the touch module. The thickness of an outer edge of the covering portion adjacent to the touch display zone is between 1 mm and 2 mm, and the minimum distance from the outer edge of the covering portion to the touch display zone is between 4 mm and 8 mm. The covering portion has an inclined surface. The minimum distance, in parallel with the surface of the touch module, from a starting point of the inclined surface to the outer edge of the covering portion is between 3 mm and 15 mm, and an included angle formed between an extensive surface of the inclined surface and the surface of the touch module is between 3° and 20°.

As mentioned above, in the touch device according to the invention, the front frame element is disposed at an outer edge of the touch module and includes a covering portion disposed on the surface of the touch module. The thickness of an outer edge of the covering portion adjacent to the touch display zone is between 0.1 mm and 1.6 mm, and the minimum distance from the outer edge of the covering portion to the touch display zone is between 2 mm and 8 mm. Moreover, as an embodiment of the touch device of the invention, the front frame element is disposed at an outer edge of the touch module and includes a covering portion disposed on the surface of the touch module. The thickness of an outer edge of the covering portion adjacent to the touch display zone is between 0.1 mm and 1 mm, and the minimum distance from the outer edge of the covering portion to the touch display zone is between 2 mm and 8 mm. The covering portion includes an inclined surface, and in parallel with the surface of the touch module, the minimum distance from a starting point of the inclined surface to the outer edge of the covering portion is between 2 mm and 15 mm, and an included angle θ formed between an extensive surface of the inclined surface and the surface of the touch module is between 1° and 20°. Moreover, as an embodiment of the touch device of the invention, the front frame element is disposed at an outer edge of the touch module and includes a covering portion disposed on the surface of the touch module. The thickness of an outer edge of the covering portion adjacent to the touch display zone is between 1 mm and 2 mm, and the minimum distance from the outer edge of the covering portion to the touch display zone is between 4 mm and 8 mm. The covering portion includes an inclined surface, and in parallel with the surface of the touch module, the minimum distance from a starting point of the inclined surface to the outer edge of the covering portion is between 3 mm and 15 mm, and an included angle θ formed between an extensive surface of the inclined surface and the surface of the touch module is between 3° and 20°. By the above-mentioned design of the touch device with a novel structure, the user's operation can be provided with better touch accuracy and touch sensitivity.

BRIEF DESCRIPTION OF THE DRAWINGS

The invention will become more fully understood from the detailed description and accompanying drawings, which are given for illustration only, and there are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
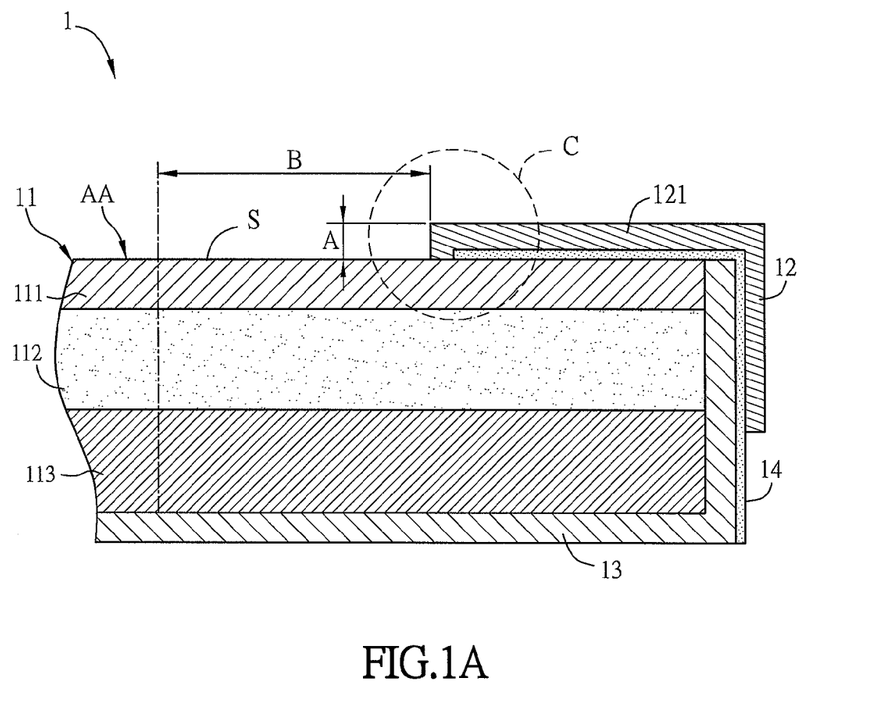
FIG. 1A is a schematic diagram of a touch device according to an embodiment of the invention.
Figure 1B:
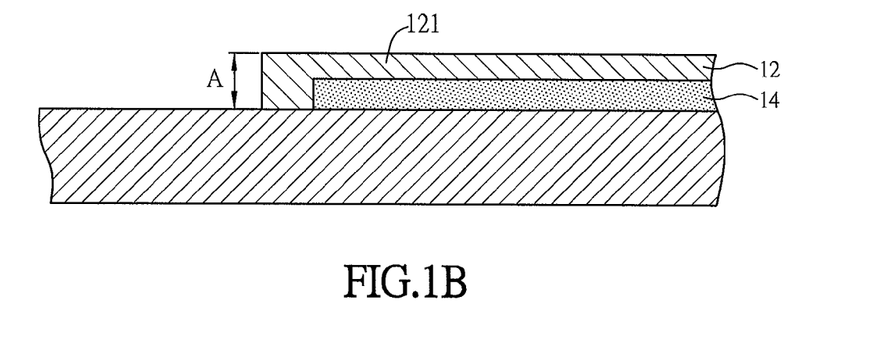
FIG. 1B is a schematic enlarged diagram of the region C of FIG. 1A.

FIG. 1A is a schematic diagram of a touch device 1 according to an embodiment of the invention, and FIG. 1B is a schematic enlarged diagram of the region C of FIG. 1A. The touch device 1 is, for example but not limited to, a liquid crystal display (LCD) device, an organic light-emitting diode (OLED) display device or another type of flat display device capable of a touch function.

The touch device 1 includes a touch module 11 and a front frame element 12. The touch device 1 can further include a back plate 13 and a light-blocking element 14.

In this embodiment, the touch module 11 includes a touch panel 111 and a display panel 112 disposed opposite to the touch panel 111. In other words, the touch module 11 of this embodiment is an on-cell touch device. The touch panel 111 includes a touch electrode layer (not shown). The display panel 112 can be an LCD panel, an OLED display panel or another type of flat display panel. Herein for example, the display panel 112 is an LCD panel, and the LCD panel (display panel 112) includes a first substrate and a second substrate (not shown) disposed opposite to the first substrate. The first substrate can be a thin film transistor (TFT) substrate while the second substrate can be a color filter (CF) substrate. Nevertheless, in other embodiments, the black matrix or color filter layer of the CF substrate can be disposed on the TFT substrate so that the first substrate can become a BOA (BM on array) substrate or a COA (color filter on array) substrate. Besides, the LCD panel (display panel 112) can further include a liquid crystal layer (not shown), which is disposed between the first and second substrates.

In other embodiments, the touch module 11 can include a display panel and a touch electrode layer (not shown), and the touch electrode layer is disposed in the display panel. For example, the display panel includes a first substrate and a second substrate disposed opposite to the first substrate, and the touch electrode layer is disposed on the second substrate (e.g. CF substrate), so that the touch device 1 becomes an in-cell touch device.

The touch module 11 of this embodiment further includes a backlight module 113, which is disposed opposite to the display panel 112 and can emit light to the display panel 112 so that the display panel 112 can display images. The backlight module 113 can include a reflective plate, a light-guiding plate and a plurality of optical films. Since a conventional backlight module can be used as the backlight module 113 and can be comprehended by those skilled in the art, the function and construction thereof won't be described here for conciseness. In the case of the touch panel 111 being an OLED display panel, the backlight module 113 is not required since the OLED display panel is a self-luminous display panel.

The touch module 11 includes a surface S having a touch display zone AA. Herein, the touch display zone AA is the active area of the touch module 11. The user can view images through the touch display zone AA and also can perform the touch control on the touch display zone AA.

The front frame element 12 is disposed at an outer edge of the touch module 11. The front frame element 12 includes a covering portion 121, which is disposed on the surface S of the touch module 11. In other words, the covering portion 121 is located at the outer edge of the touch module 11 and covers a part of the outer edge. As shown in FIGS. 1A and 1B, the covering portion 121 of this embodiment has a flat shape and includes an outer edge adjacent to the touch display zone AA. The thickness A of the outer edge is between 0.1 mm and 1.6 mm (it also can be said that the thickness of the covering portion 121 is between 0.1 mm and 1.6 mm). Moreover, the minimum distance B from the outer edge of the covering portion 121 to the touch display zone AA is between 2 mm and 8 mm. Favorably, as an embodiment, the thickness A of the outer edge of the covering portion 121 is between 0.8 mm and 1.2 mm, and the minimum distance B from the outer edge of the covering portion 121 to the touch display zone AA is between 5 mm and 7 mm. By the above-mentioned design of the touch device 1, the user's operation can be provided with better touch accuracy and touch sensitivity.

The touch module 11 is disposed to the back plate 13. Herein, the back plate 13 is used to contain the touch module 11 and provide the protection against collision, electromagnetic wave or electric shock. The back plate 13 includes plastic, metal or alloy material for example.

The light-blocking element 14 is extended from the surface S of the touch module 11 to the back plate 13. The front frame element 12 covers the light-blocking element 14. The light-blocking element 14 is, for example but not limited to, a light-blocking bezel, and is extended from the edge of the surface S of the touch module 11 to the side surface of the back plate 13 to block the diffused light at the edge of the touch module 11 and effect a fixing function. Herein, the light-blocking element 14 is disposed on the back plate 13 by adhering and covers the partial surface S of the touch module 11 and the side surface of the back plate 13.

Figure 2A:
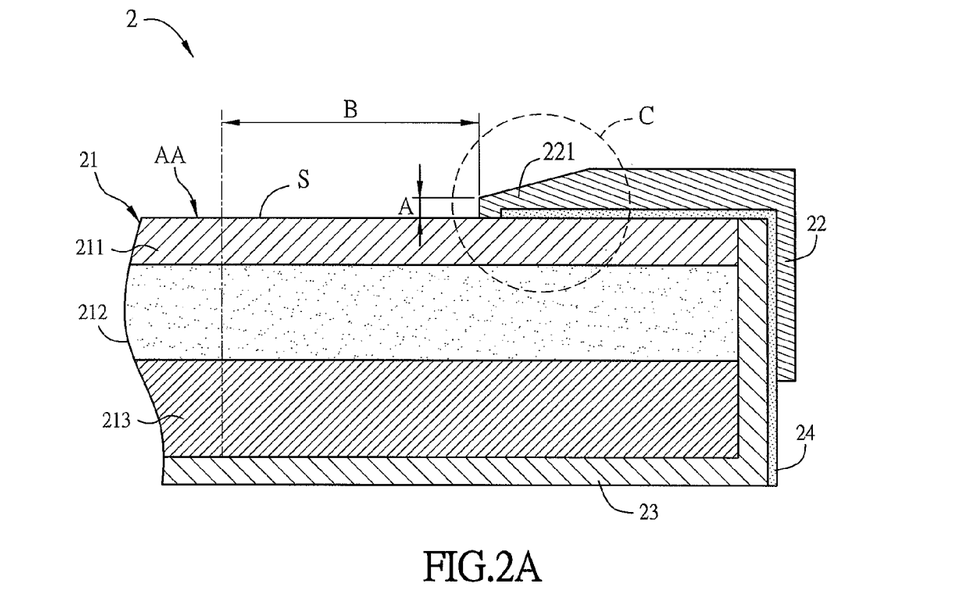
FIG. 2A is a schematic diagram of a touch device according to another embodiment of the invention.
Figure 2B:
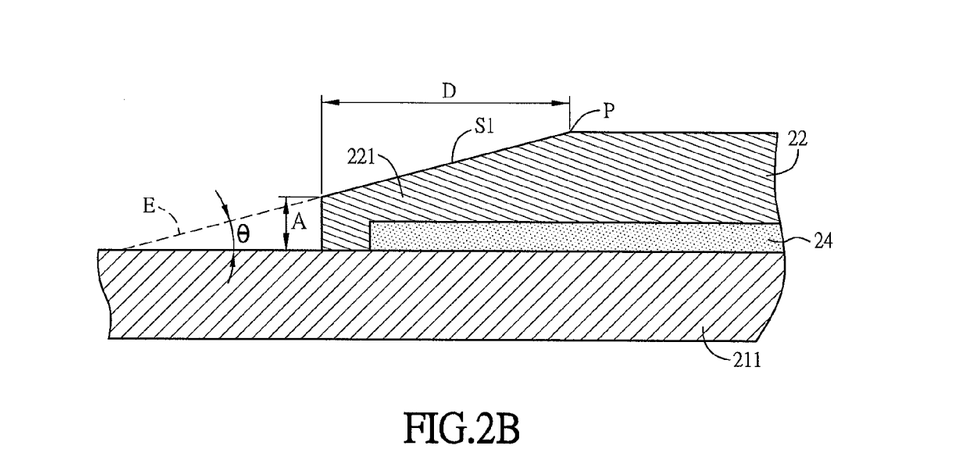
FIG. 2B is a schematic enlarged diagram of the region C of FIG. 2A.

FIG. 2A is a schematic diagram of a touch device 2 according to another embodiment of the invention, and FIG. 2B is a schematic enlarged diagram of the region C of FIG. 2A. The touch device 2 is, for example but not limited to, a liquid crystal display (LCD) device, an organic light-emitting diode (OLED) display device or another type of flat display device capable of a touch function. Moreover, the touch device 2 of this embodiment is a smaller-sized touch device, and can be a notebook (NB) or an ultrabook for example.

The touch device 2 includes a touch module 21 and a front frame element 22. The touch device 2 can further include a back plate 23 and a light-blocking element 24.

In this embodiment, the touch module 21 includes a touch panel 211 and a display panel 212 disposed opposite to the touch panel 211. In other words, the touch module 21 of this embodiment is an on-cell touch device. The touch panel 211 includes a touch electrode layer (not shown). The display panel 212 can be an LCD panel, an OLED display panel or another type of flat display panel. Herein for example, the display panel 212 is an LCD panel, and the LCD panel (display panel 212) includes a first substrate and a second substrate (not shown) disposed opposite to the first substrate. The first substrate can be a thin film transistor (TFT) substrate while the second substrate can be a color filter (CF) substrate. Nevertheless, in other embodiments, the black matrix or color filter layer of the CF substrate can be disposed on the TFT substrate so that the first substrate can become a BOA (BM on array) substrate or a COA (color filter on array) substrate. Besides, the LCD panel (display panel 212) can further include a liquid crystal layer (not shown), which is disposed between the first and second substrates.

In other embodiments, the touch module 21 can include a display panel and a touch electrode layer, (not shown), and the touch electrode layer is disposed in the display panel. For example, the display panel includes a first substrate and a second substrate disposed opposite to the first substrate, and the touch electrode layer is disposed on the second substrate (e.g. CF substrate), so that the touch device 2 becomes an in-cell touch device.

The touch module 21 of this embodiment further includes a backlight module 213, which is disposed opposite to the display panel 212 and can emit light to the display panel 212 so that the display panel 212 can display images. The backlight module 213 can include a reflective plate, a light-guiding plate and a plurality of optical films. Since a conventional backlight module can be used as the backlight module 213 and can be comprehended by those skilled in the art, the function and construction thereof won't be described here for conciseness. In the case of the touch panel 211 being an OLED display panel, the backlight module 213 is not required since the OLED display panel is a self-luminous display panel.

The touch module 21 includes a surface S having a touch display zone AA. Herein, the touch display zone AA is the active area of the touch module 21. The user can view images through the touch display zone AA and also can perform the touch control on the touch display zone AA.

The front frame element 22 is disposed at an outer edge of the touch module 21. The front frame element 22 includes a covering portion 221, which is disposed on the surface S of the touch module 21. In other words, the covering portion 221 is located at the outer edge of the touch module 21 and covers a part of the outer edge. As shown in FIGS. 2A and 2B, the covering portion 221 of this embodiment has an inclined surface S1. The covering portion 221 includes an outer edge adjacent to the touch display zone AA. The thickness A of the outer edge is between 0.1 mm and 1 mm (it also can be said that the minimum thickness of the covering portion 221 is between 0.1 mm and 1 mm). Moreover, the minimum distance B from the outer edge of the covering portion 221 to the touch display zone AA is between 2 mm and 8 mm. Furthermore, as shown in FIG. 2B, in parallel with the surface S of the touch module 21, the minimum distance D from a starting point P of the inclined surface S1 to the outer edge of the covering portion 221 is between 2 mm and 15 mm. Additionally, an included angle $\theta$ formed between an extensive surface E of the inclined surface S1 and the surface S is between 1° and 20°.

Favorably, as an embodiment, the thickness A of the outer edge of the covering portion 221 is between 0.8 mm and 0.9 mm, and the minimum distance B from the outer edge to the touch display zone AA is between 5.5 mm and 6 mm. Moreover, in parallel with the surface S of the touch module 21, the minimum distance D from the starting point P to the outer edge of the covering portion 221 is between 4.5 mm and 5 mm, and the included angle $\theta$ is between 6° and 8°. Favorably, as an embodiment, the thickness A of the outer edge of the covering portion 221 is between 0.8 mm and 0.9 mm, and the minimum distance B from the outer edge to the touch display zone AA is between 5 mm and 5.5 mm. Moreover, in parallel with the surface S of the touch module 21, the minimum distance D from the starting point P to the outer edge of the covering portion 221 is between 5 mm and 5.5 mm, and the included angle $\theta$ is between 8° and 10°. Favorably, as an embodiment, the thickness A of the outer edge of the covering portion 221 is between 0.8 mm and 1 mm, and the minimum distance B from the outer edge to the touch display zone AA is between 5 mm and 6 mm. Moreover, in parallel with the surface S of the touch module 21, the minimum distance D from the starting point P to the outer edge of the covering portion 221 is between 5 mm and 5.5 mm, and the included angle $\theta$ is between 12° and 15°. By the above-mentioned design of the touch device 2, the user's operation can be provided with better touch accuracy and touch sensitivity.

The touch module 21 is disposed to the back plate 23. Herein, the back plate 23 is used to contain the touch module 21 and provide the protection against collision, electromagnetic wave or electric shock. The back plate 23 includes plastic, metal or alloy material for example.

The light-blocking element 24 is extended from the surface S of the touch module 21 to the back plate 23. The front frame element 22 covers the light-blocking element 24. The light-blocking element 24 is, for example but not limited to, a light-blocking bezel, and is extended from the surface S of the touch module 21 to the side surface of the back plate 23 to block the diffused light at the edge of the touch device 2 and effect a fixing function. Herein, the light-blocking element 24 is disposed on the back plate 23 by adhering and covers the partial surface S of the touch module 21 and the side surface of the back plate 23.

Figure 3A:
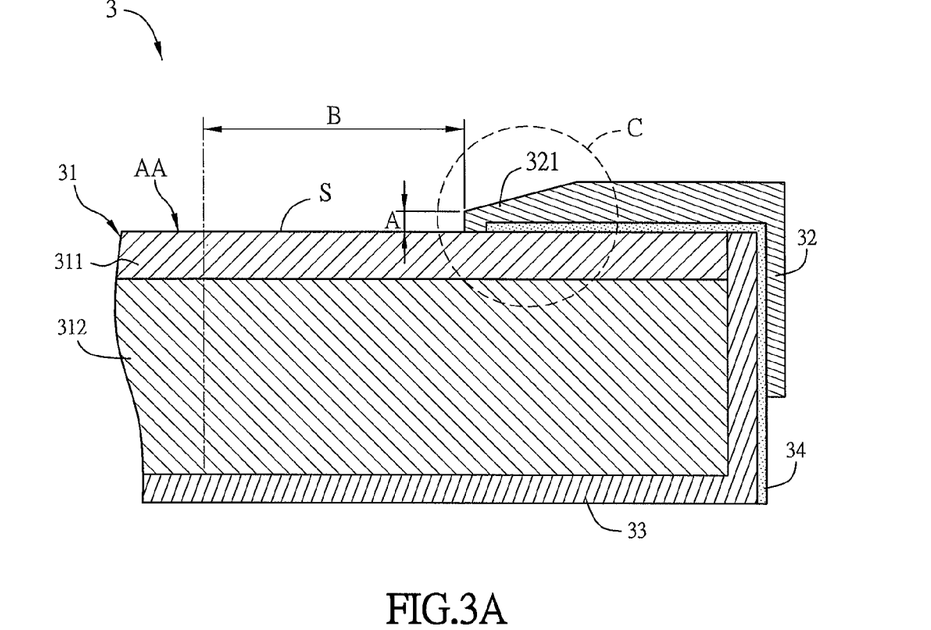
FIG. 3A is a schematic diagram of a touch device according to another embodiment of the invention.
Figure 3B:
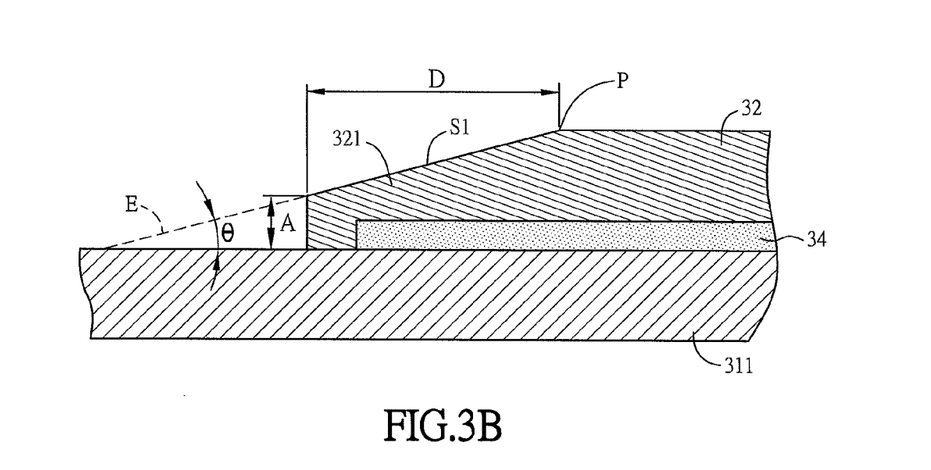
FIG. 3B is a schematic enlarged diagram of the region C of FIG. 3A.

FIG. 3A is a schematic diagram of a touch device 3 according to another embodiment of the invention, and FIG. 3B is a schematic enlarged diagram of the region C of FIG. 3A. The touch device 3 is, for example but not limited to, a liquid crystal display (LCD) device, an organic light-emitting diode (OLED) display device or another type of flat display device capable of a touch function. Moreover, the touch device 3 of this embodiment is a larger-sized touch device, and can be a touch screen of a desktop computer or a medium-sized or large-sized touch monitor for example.

The touch device 3 includes a touch module 31 and a front frame element 32. The touch device 3 can further include a back plate 33 and a light-blocking element 34.

In this embodiment, the touch module 31 includes a touch panel 311 and a display panel 312 disposed opposite to the touch panel 311. In other words, the touch module 31 of this embodiment is also an on-cell touch device. The touch panel 311 includes a touch electrode layer (not shown). The display panel 312 can be an LCD panel, an OLED display panel or another type of flat display panel. Herein for example, the display panel 312 is an OLED display panel. In other embodiments, however, the touch module 31 can include a display panel and a touch electrode layer (not shown), and the touch electrode layer is disposed in the display panel, so that the touch device 3 becomes an in-cell touch device. Since the OLED display panel is a self-luminous display panel, the backlight module is not required for the touch module 31.

The touch module 31 includes a surface S having a touch display zone AA. Herein, the touch display zone AA is the active area of the touch module 31. The user can view images through the touch display zone AA and also can perform the touch control on the touch display zone AA.

The front frame element 32 is disposed at an outer edge of the touch module 31. The front frame element 32 includes a covering portion 321, which is disposed on the surface S of the touch module 31. In other words, the covering portion 321 is located at the outer edge of the touch module 31 and covers a part of the outer edge. As shown in FIGS. 3A and 3B, the covering portion 321 of this embodiment also has an inclined surface S1. The covering portion 321 includes an outer edge adjacent to the touch display zone AA. The thickness A of the outer edge is between 1 mm and 2 mm (it also can be said that the minimum thickness of the covering portion 321 is between 1 mm and 2 mm). Moreover, the minimum distance B from the outer edge of the covering portion 321 to the touch display zone AA is between 4 mm and 8 mm. Furthermore, as shown in FIG. 3B, in parallel with the surface S of the touch module 31, the minimum distance D from a starting point P of the inclined surface S1 to the outer edge of the covering portion 321 is between 3 mm and 15 mm. Additionally, an included angle θ formed between an extensive surface E of the inclined surface S1 and the surface S is between 3° and 20°.

Favorably, as an embodiment, the thickness A of the outer edge of the covering portion 321 is between 1 mm and 1.2 mm, and the minimum distance B from the outer edge to the touch display zone AA is between 5 mm and 6 mm. Moreover, in parallel with the surface S of the touch module 31, the minimum distance D from the starting point P to the outer edge is between 5 mm and 6 mm, and the included angle θ is between 10° and 12°. Favorably, as an embodiment, the thickness A of the outer edge of the covering portion 321 is between 1.3 mm and 1.5 mm, and the minimum distance B from the outer edge to the touch display zone AA is between 5 mm and 6 mm. Moreover, in parallel with the surface S of the touch module 31, the minimum distance D from the starting point P to the outer edge is between 7 mm and 9 mm, and the included angle θ is between 16° and 20°. Favorably, as an embodiment, the thickness A of the outer edge of the covering portion 321 is between 1.3 mm and 1.5 mm, and the minimum distance B from the outer edge to the touch display zone AA is between 5.5 mm and 7 mm. Moreover, in parallel with the surface S of the touch module 31, the minimum distance D from the starting point P to the outer edge is between 5 mm and 6 mm, and the included angle θ is between 10° and 12°. Favorably, as an embodiment, the thickness A of the outer edge of the covering portion 321 is between 1.5 mm and 1.7 mm, and the minimum distance B from the outer edge to the touch display zone AA is between 5.5 mm and 6 mm. Moreover, in parallel with the surface S of the touch module 31, the minimum distance D from the starting point P to the outer edge is between 7 mm and 8 mm, and the included angle θ is between 17° and 20°. Favorably, as an embodiment, the thickness A of the outer edge of the covering portion 321 is between 1.5 mm and 1.7 mm, and the minimum distance B from the outer edge to the touch display zone AA is between 6 mm and 7 mm. Moreover, in parallel with the surface S of the touch module 31, the minimum distance D from the starting point P to the outer edge is between 8 mm and 9 mm, and the included angle θ is between 13° and 16°. By the above-mentioned design of the touch device 3, the user's operation can be provided with better touch accuracy and touch sensitivity.

The touch module 31 is disposed to the back plate 33. Herein, the back plate 33 is used to contain the touch module 31 and provide the protection against collision, electromagnetic wave or electric shock. The back plate 33 includes plastic, metal or alloy material for example.

The light-blocking element 34 is extended from the surface S of the touch module 31 to the back plate 33. The front frame element 32 covers the light-blocking element 34. The light-blocking element 34 is, for example but not limited to, a light-blocking bezel, and is extended from the surface S of the touch module 31 to the side surface of the back plate 33 to block the diffused light at the edge of the touch device 3 and effect a fixing function. Herein, the light-blocking element 34 is disposed on the back plate 33 by adhering and covers the partial surface S of the touch module 31 and the side surface of the back plate 33.

Figure 4:
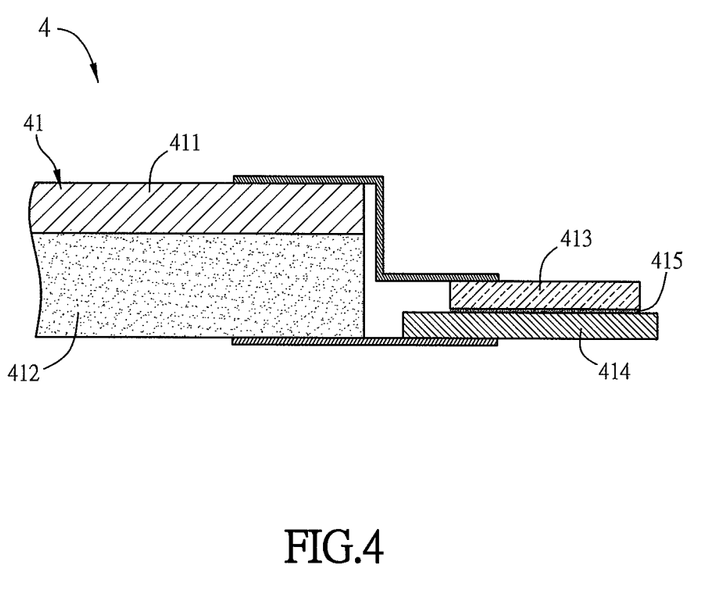
FIG. 4 is a schematic diagram of a touch device according to another embodiment of the invention.

FIG. 4 is a schematic diagram of a touch device 4 according to another embodiment of the invention. Herein, just some elements of the touch device 4 are shown for clearly illustrating the features of this embodiment.

The touch device 4 includes a touch module 41, and the touch module 41 includes a touch panel 411 and a display panel 412 disposed opposite to the touch panel 411. Since the touch panel 411 has the technical features of the above-mentioned touch panels 111, 211, 311 and the display panel 412 has the technical features of the above-mentioned display panels 112, 212, 312, the related descriptions are omitted here for conciseness.

In this embodiment, the touch device 4 further includes a first circuit board 413 and a second circuit board 414. The first circuit board 413 is electrically connected to the touch panel 411, and the second circuit board 414 is electrically connected to the display panel 412. Herein, the first and second circuit boards 413 and 414 are disposed on a side of the touch module 41. The first circuit board 413 can be electrically connected to the touch panel 411 by a flexible film such as FPC or COF, and the second circuit board 414 can be electrically connected to the display panel 412 by a flexible film such as FPC or COF. The first circuit board 413 is attached to the second circuit board 414 by an adhesive element 415. Herein, the adhesive element 415 is a twin adhesive tape for example. Thereby, the first circuit board 413 can be directly attached to the second circuit board 414, and the flexible films such as FPC or COF can be avoided from being bent to the backside of the touch module 41 so as not to be broken.

To be noted, the above-mentioned touch devices are all illustrated as the on-cell type. For the on-cell touch device, the touch electrode layer is disposed on an additional transparent substrate rather than the display panel. The transparent substrate can be a cover glass or a PMMA substrate with high hardness, and therefore the touch device can be thinned and lightened.

Summarily, in the touch device according to the invention, the front frame element is disposed at an outer edge of the touch module and includes a covering portion disposed on the surface of the touch module. The thickness of an outer edge of the covering portion adjacent to the touch display zone is between 0.1 mm and 1.6 mm, and the minimum distance from the outer edge of the covering portion to the touch display zone is between 2 mm and 8 mm. Moreover, as an embodiment of the touch device of the invention, the front frame element is disposed at an outer edge of the touch module and includes a covering portion disposed on the surface of the touch module. The thickness of an outer edge of the covering portion adjacent to the touch display zone is between 0.1 mm and 1 mm, and the minimum distance from the outer edge of the covering portion to the touch display zone is between 2 mm and 8 mm. The covering portion includes an inclined surface, and in parallel with the surface of the touch module, the minimum distance from a starting point of the inclined surface to the outer edge of the covering portion is between 2 mm and 15 mm, and an included angle θ formed between an extensive surface of the inclined surface and the surface of the touch module is between 1° and 20°. Moreover, as an embodiment of the touch device of the invention, the front frame element is disposed at an outer edge of the touch module and includes a covering portion disposed on the surface of the touch module. The thickness of an outer edge of the covering portion adjacent to the touch display zone is between 1 mm and 2 mm, and the minimum distance from the outer edge of the covering portion to the touch display zone is between 4 mm and 8 mm. The covering portion includes an inclined surface, and in parallel with the surface of the touch module, the minimum distance from a starting point of the inclined surface to the outer edge of the covering portion is between 3 mm and 15 mm, and an included angle θ formed between an extension surface of the inclined surface and the surface of the touch module is between 3° and 20°. By the above-mentioned design of the touch device with a novel structure, the user's operation can be provided with better touch accuracy and touch sensitivity.

Although the invention has been described with reference to specific embodiments, this description is not meant to be construed in a limiting sense. Various modifications of the disclosed embodiments, as well as alternative embodiments, will be apparent to persons skilled in the art. Therefore, it is contemplated that the appended claims will cover all modifications that fall within the true scope of the invention.

What is claimed is:

1. A touch device, comprising:
a touch module including a surface having a touch display zone; and
a front frame element disposed at an outer edge of the touch module and including a covering portion located on the surface of the touch module, wherein the thickness of an outer edge of the covering portion adjacent to the touch display zone is between 0.1 mm and 1 mm, the minimum distance from the outer edge of the covering portion to the touch display zone is between 2 mm and 8 mm, the covering portion has an inclined surface, the minimum distance, in parallel with the surface of the touch module, from a starting point of the inclined surface to the outer edge of the covering portion is between 2 mm and 15 mm, and an included angle formed between an extensive surface of the inclined surface and the surface of the touch module is between 1° and 20°.

2. The touch device as recited in claim 1, wherein the thickness of the outer edge of the covering portion is between 0.8 mm and 0.9 mm, the minimum distance from the outer edge of the covering portion to the touch display zone is between 5.5 mm and 6 mm, the minimum distance, in parallel with the surface of the touch module, from the starting point of the inclined surface to the outer edge of the covering portion is between 4.5 mm and 5 mm, and the included angle is between 6° and 8°.

3. The touch device as recited in claim 1, wherein the thickness of the outer edge of the covering portion is between 0.8 mm and 0.9 mm, the minimum distance from the outer edge of the covering portion to the touch display zone is between 5 mm and 5.5 mm, the minimum distance, in parallel with the surface of the touch module, from the starting point of the inclined surface to the outer edge of the covering portion is between 5 mm and 5.5 mm, and the included angle is between 8° and 10°.

4. The touch device as recited in claim 1, wherein the thickness of the outer edge of the covering portion is between 0.8 mm and 1 mm, the minimum distance from the outer edge of the covering portion to the touch display zone is between 5 mm and 6 mm, the minimum distance, in parallel with the surface of the touch module, from the starting point of the inclined surface to the outer edge of the covering portion is between 5 mm and 5.5 mm, and the included angle is between 12° and 15°.

5. The touch device as recited in claim 3, wherein the touch module includes a touch panel and a display panel disposed opposite to the touch panel.

6. The touch device as recited in claim 5, further comprising:
a first circuit board electrically connected to the touch panel; and
a second circuit board electrically connected to the display panel,
wherein the first circuit board is attached to the second circuit board by an adhesive element.

7. A touch device, comprising:
a touch module including a surface having a touch display zone; and
a front frame element disposed at an outer edge of the touch module and including a covering portion located on the surface of the touch module, wherein the thickness of an outer edge of the covering portion adjacent to the touch display zone is between 1 mm and 2 mm, the minimum distance from the outer edge of the covering portion to the touch display zone is between 4 mm and 8 mm, the covering portion has an inclined surface, the minimum distance, in parallel with the surface of the touch module, from a starting point of the inclined surface to the outer edge of the covering portion is between 3 mm and 15 mm, and an included angle formed between an extensive surface of the inclined surface and the surface of the touch module is between 3° and 20°.

8. The touch device as recited in claim 7, wherein the thickness of the outer edge of the covering portion is between 1 mm and 1.2 mm, the minimum distance from the outer edge of the covering portion to the touch display zone is between 5 mm and 6 mm, the minimum distance, in parallel with the surface of the touch module, from the starting point of the inclined surface to the outer edge of the covering portion is between 5 mm and 6 mm, and the included angle is between 10° and 12°.

9. The touch device as recited in claim 7, wherein the thickness of the outer edge of the covering portion is between 1.3 mm and 1.5 mm, the minimum distance from the outer edge of the covering portion to the touch display zone is between 5 mm and 6 mm, the minimum distance, in parallel with the surface of the touch module, from the starting point of the inclined surface to the outer edge of the covering portion is between 7 mm and 9 mm, and the included angle is between 16° and 20°.

10. The touch device as recited in claim 7, wherein the thickness of the outer edge of the covering portion is between 1.3 mm and 1.5 mm, the minimum distance from the outer edge of the covering portion to the touch display zone is between 5.5 mm and 7 mm, the minimum distance, in parallel with the surface of the touch module, from the starting point of the inclined surface to the outer edge of the covering portion is between 5 mm and 6 mm, and the included angle is between 10° and 12°.

11. The touch device as recited in claim 7, wherein the thickness of the outer edge of the covering portion is between 1.5 mm and 1.7 mm, the minimum distance from the outer edge of the covering portion to the touch display zone is between 5.5 mm and 6 mm, the minimum distance, in parallel with the surface of the touch module, from the starting point of the inclined surface to the outer edge of the covering portion is between 7 mm and 8 mm, and the included angle is between 17° and 20°.

12. The touch device as recited in claim 7, wherein the thickness of the outer edge of the covering portion is between 1.5 mm and 1.7 mm, the minimum distance from the outer edge of the covering portion to the touch display zone is between 6 mm and 7 mm, the minimum distance, in parallel with the surface of the touch module, from the starting point of the inclined surface to the outer edge of the covering portion is between 8 mm and 9 mm, and the included angle is between 13° and 16°.

13. The touch device as recited in claim 7, wherein the touch module includes a touch panel and a display panel disposed opposite to the touch panel.

14. The touch device as recited in claim 13, further comprising:
- a first circuit board electrically connected to the touch panel; and
- a second circuit board electrically connected to the display panel,
- wherein the first circuit board is attached to the second circuit board by an adhesive element.

\* \* \* \* \*